(12) United States Patent
Childs et al.

(10) Patent No.: US 9,528,717 B2
(45) Date of Patent: Dec. 27, 2016

(54) EFFICIENCY HEATING, VENTILATING, AND AIR-CONDITIONING THROUGH EXTENDED RUN-TIME CONTROL

(75) Inventors: Joseph E. Childs, Golden, CO (US); Roger W. Rognli, Otsego, MN (US); Robert J. Cox, Maple Grove, MN (US); Brock Simonson, Carrington, ND (US)

(73) Assignee: Cooper Technologies Company, Houston, TX (US)

( * ) Notice: Subject to any disclaimer, the term of this patent is extended or adjusted under 35 U.S.C. 154(b) by 822 days.

(21) Appl. No.: 13/407,343

(22) Filed: Feb. 28, 2012

(65) Prior Publication Data

US 2013/0219931 A1 Aug. 29, 2013

(51) Int. Cl.
| | |
|---|---|
| G05D 23/32 | (2006.01) |
| F25B 1/00 | (2006.01) |
| F25B 49/00 | (2006.01) |
| F25B 19/00 | (2006.01) |
| F24F 11/00 | (2006.01) |
| F25B 49/02 | (2006.01) |

(52) U.S. Cl.
CPC ...... *F24F 11/008* (2013.01); *F24F 2011/0073* (2013.01); *F24F 2011/0075* (2013.01); *F25B 49/022* (2013.01); *F25B 2600/01* (2013.01); *F25B 2600/02* (2013.01); *F25B 2600/024* (2013.01); *F25B 2600/0251* (2013.01); *F25B 2600/25* (2013.01)

(58) Field of Classification Search
CPC .............. F24F 11/008; F24F 2011/0075; F24F 2011/0073; F25B 2600/25; F25B 2600/01; F25B 2600/02; F25B 2600/024; F25B 2600/0251; F25B 49/022

USPC ................................ 62/157, 228.1, 231, 226
See application file for complete search history.

(56) References Cited

U.S. PATENT DOCUMENTS

| | | | |
|---|---|---|---|
| 3,558,911 A | | 1/1971 | Chen |
| 3,683,343 A | | 8/1972 | Feldman et al. |
| 3,780,532 A | * | 12/1973 | Norbeck et al. ................. 62/201 |
| 3,979,059 A | | 9/1976 | Davis et al. |

(Continued)

FOREIGN PATENT DOCUMENTS

| | | |
|---|---|---|
| EP | 0 593 225 B1 | 4/1997 |
| WO | WO 01/52478 A2 | 7/2001 |

OTHER PUBLICATIONS

James et al., "The Effect of Residential Equipment Capacity on Energy Use, Demand, and Run-Time", ASHRAE Transactions, 1997, vol. 103, Pt. 2, American Society of Heating, Refrigerating, and Air-Conditioning Engineers, Inc., Atlanta, GA, 10 pages.

(Continued)

*Primary Examiner* — Marc Norman
*Assistant Examiner* — Daniel C Comings
(74) *Attorney, Agent, or Firm* — Patterson Thuente Pedersen, P.A.

(57) ABSTRACT

An extended run time device for extending the time that a compressor-based heating, ventilating, and air-conditioning (HVAC) system runs so as to increase energy efficiency of the HVAC system. The extended run time device includes a sensing circuit, a switching device and a processor. Based upon a signal from the sensing circuit, the processor causes the switching device to transmit a proxy control signal to the compressor, thereby causing power to the compressor to be maintained for a time period longer than a time period requested by the temperature control device.

14 Claims, 5 Drawing Sheets

(56) References Cited

U.S. PATENT DOCUMENTS

| | | | |
|---|---|---|---|
| 3,993,984 A | 11/1976 | Penrod | |
| 4,094,166 A | 6/1978 | Jerles | |
| D248,838 S | 8/1978 | Pasquarette et al. | |
| 4,130,874 A | 12/1978 | Pai | |
| 4,156,280 A | 5/1979 | Griess | |
| 4,190,800 A | 2/1980 | Kelly, Jr. et al. | |
| 4,228,511 A | 10/1980 | Simcoe et al. | |
| 4,292,813 A | 10/1981 | Paddock | |
| 4,297,852 A * | 11/1981 | Brooks | 62/153 |
| 4,341,345 A | 7/1982 | Hammer et al. | |
| 4,345,162 A | 8/1982 | Hammer et al. | |
| 4,371,947 A | 2/1983 | Fujisawa | |
| 4,389,577 A | 6/1983 | Anderson et al. | |
| 4,390,876 A | 6/1983 | Bjorklund et al. | |
| D270,815 S | 10/1983 | Odom | |
| 4,415,943 A | 11/1983 | Wortman | |
| 4,464,724 A | 8/1984 | Gurr et al. | |
| 4,537,038 A | 8/1985 | Alsenz et al. | |
| 4,551,812 A | 11/1985 | Gurr et al. | |
| 4,583,090 A | 4/1986 | Eden et al. | |
| 4,620,283 A | 10/1986 | Butt et al. | |
| 4,635,214 A | 1/1987 | Kasai et al. | |
| 4,657,179 A | 4/1987 | Aggers et al. | |
| 4,672,501 A | 6/1987 | Bilac et al. | |
| 4,780,910 A | 10/1988 | Huddleston et al. | |
| 4,804,938 A | 2/1989 | Rouse et al. | |
| 4,808,803 A | 2/1989 | Magier et al. | |
| 4,819,180 A | 4/1989 | Hedman et al. | |
| 4,902,964 A | 2/1990 | Szabela et al. | |
| 5,099,348 A | 3/1992 | Huddleston et al. | |
| 5,197,668 A | 3/1993 | Ratz et al. | |
| 5,203,497 A | 4/1993 | Ratz et al. | |
| 5,209,076 A * | 5/1993 | Kauffman | F25B 49/005 62/126 |
| 5,218,552 A | 6/1993 | Stirk et al. | |
| 5,319,296 A | 6/1994 | Patel | |
| 5,355,686 A * | 10/1994 | Weiss | 62/89 |
| 5,414,640 A | 5/1995 | Seem | |
| 5,426,620 A | 6/1995 | Budney | |
| 5,462,225 A | 10/1995 | Massara et al. | |
| 5,475,609 A | 12/1995 | Apothaker | |
| 5,479,785 A * | 1/1996 | Novak | 62/155 |
| 5,502,339 A | 3/1996 | Hartig | |
| 5,519,622 A | 5/1996 | Chasek | |
| 5,576,700 A | 11/1996 | Davis et al. | |
| 5,579,700 A | 12/1996 | Nuechterlein et al. | |
| 5,619,121 A | 4/1997 | Trainor | |
| 5,640,153 A | 6/1997 | Hildebrand et al. | |
| 5,675,503 A | 10/1997 | Moe et al. | |
| 5,687,139 A | 11/1997 | Budney | |
| 5,696,695 A | 12/1997 | Ehlers et al. | |
| 5,761,083 A | 6/1998 | Brown, Jr. et al. | |
| 5,936,817 A | 8/1999 | Matsko et al. | |
| 5,960,639 A | 10/1999 | Hammer | |
| 5,971,598 A | 10/1999 | Baba et al. | |
| 6,029,092 A | 2/2000 | Stein | |
| 6,098,893 A | 8/2000 | Berglund et al. | |
| 6,157,874 A | 12/2000 | Cooley et al. | |
| 6,167,389 A | 12/2000 | Davis et al. | |
| 6,181,985 B1 | 1/2001 | O'Donnell et al. | |
| 6,208,905 B1 | 3/2001 | Giddings et al. | |
| 6,254,009 B1 | 7/2001 | Proffitt et al. | |
| 6,264,110 B1 | 7/2001 | Proffitt et al. | |
| 6,305,611 B1 | 10/2001 | Proffitt et al. | |
| 6,314,378 B1 | 11/2001 | Hodge et al. | |
| 6,356,426 B1 | 3/2002 | Dougherty | |
| 6,377,874 B1 | 4/2002 | Ykema | |
| 6,480,803 B1 | 11/2002 | Pierret et al. | |
| 6,496,342 B1 | 12/2002 | Horvath et al. | |
| 6,509,841 B1 | 1/2003 | Colton et al. | |
| 6,512,966 B2 | 1/2003 | Lof et al. | |
| 6,519,509 B1 | 2/2003 | Nierlich et al. | |
| 6,574,581 B1 | 6/2003 | Bohrer et al. | |
| 6,587,739 B1 | 7/2003 | Abrams et al. | |
| 6,622,926 B1 | 9/2003 | Sartain et al. | |
| 6,634,566 B2 | 10/2003 | Archacki, Jr. et al. | |
| 6,671,586 B2 | 12/2003 | Davis et al. | |
| 6,681,154 B2 | 1/2004 | Nierlich et al. | |
| 6,745,106 B2 | 6/2004 | Howard et al. | |
| 6,747,571 B2 | 6/2004 | Fierro et al. | |
| 6,789,739 B2 | 9/2004 | Rosen | |
| 6,806,446 B1 | 10/2004 | Neale | |
| 6,816,350 B1 | 11/2004 | Hoopes | |
| 6,828,695 B1 | 12/2004 | Hansen | |
| 6,891,478 B2 | 5/2005 | Gardner | |
| 6,975,926 B2 | 12/2005 | Schanin | |
| 6,975,958 B2 | 12/2005 | Bohrer et al. | |
| 7,010,363 B2 | 3/2006 | Donnelly et al. | |
| 7,136,725 B1 | 11/2006 | Paciorek et al. | |
| 7,163,158 B2 | 1/2007 | Rossi et al. | |
| 7,172,132 B2 | 2/2007 | Proffitt et al. | |
| 7,216,015 B2 | 5/2007 | Poth | |
| 7,222,111 B1 | 5/2007 | Budike, Jr. | |
| 7,242,114 B1 | 7/2007 | Cannon et al. | |
| 7,243,114 B2 | 7/2007 | Akazawa et al. | |
| 7,292,114 B2 | 11/2007 | Greenberg | |
| 7,346,467 B2 | 3/2008 | Bohrer et al. | |
| 7,355,301 B2 | 4/2008 | Ockert et al. | |
| 7,528,503 B2 | 5/2009 | Rognli et al. | |
| 7,595,567 B1 | 9/2009 | Cannon et al. | |
| 7,702,424 B2 | 4/2010 | Cannon et al. | |
| 7,869,904 B2 | 1/2011 | Cannon et al. | |
| 2002/0019712 A1 | 2/2002 | Petite et al. | |
| 2002/0087234 A1 | 7/2002 | Lof et al. | |
| 2002/0103655 A1 | 8/2002 | Boies et al. | |
| 2002/0138176 A1 | 9/2002 | Davis et al. | |
| 2003/0150925 A1 | 8/2003 | Archacki, Jr. et al. | |
| 2003/0158632 A1 | 8/2003 | Nierlich et al. | |
| 2004/0190211 A1 | 9/2004 | Ockert et al. | |
| 2004/0255601 A1 | 12/2004 | Kwon et al. | |
| 2005/0097905 A1 | 5/2005 | Kwon et al. | |
| 2005/0143865 A1 | 6/2005 | Gardner | |
| 2006/0036349 A1 | 2/2006 | Kates | |
| 2006/0036350 A1 | 2/2006 | Bohrer et al. | |
| 2006/0283964 A1 | 12/2006 | Garozzo | |
| 2006/0283965 A1 | 12/2006 | Mueller et al. | |
| 2007/0021874 A1 | 1/2007 | Rognli et al. | |
| 2008/0133065 A1 | 6/2008 | Cannon et al. | |
| 2010/0179707 A1 | 7/2010 | Cannon et al. | |
| 2013/0125572 A1 | 5/2013 | Childs et al. | |

OTHER PUBLICATIONS

United States Environmental Protection Agency, "Right-Sized Air Conditioners—Mechanical Equipment Improvements", www.energystar.gov, prior to Feb. 28, 2012, 2 pages.

PCT/US2013/025823; Search Report and Written Opinion dated May 27, 2013, 11 pages.

Honeywell International, Inc. And Cannon Technologies, Inc., ExpressCom LCR, see www.honeywellcannon.com, 2003, 4 pages.

Marketing Brochure, Cannon Technologies, Yukon.TM. Intelligent Monitoring and Notification, 2003, can be located at website www.esubstation.com, 5 pages.

Marketing Brochure, Cannon Technologies, Yukon.TM. Look how easy we've made load control, 2002, can be located at website www.loadcontrol.com, 4 pages.

Marketing Brochure, Cannon Technologies, Yukon.TM. Energy Information Aggregation Curtailment Control for your largest customers, 2002, can be located at website www.readmeter.com, 4 pages.

Marketing Brochure, Cannon Technologies, Yukon.TM. Software for Advanced Energy Services, 2002, 12 pages.

Marketing Brochure, Cannon Technolgies, Cannon 900 MHz Flex.TM. Paging Load Control Receiver, 1999/2000, pp. 4.

Marketing Brochure, Cannon Technologies, Cannon Distribution Automation Systems, pp. 1.

Marketing Brochure, Cannon Technologies, Inc., Load Response Center, 2003, pp. 2.

Product Bulletin ESPT-2., Cannon Technologies, Inc., ExpressStat Programmable Demand Response Thermostat, 2002, pp. 2.

(56) References Cited

OTHER PUBLICATIONS

Application and File History for U.S. Appl. No. 13/680,581, filed Nov. 19, 2012. Inventors: Childs et al.

* cited by examiner

EFFICIENCY HEATING, VENTILATING, AND AIR-CONDITIONING THROUGH EXTENDED RUN-TIME CONTROL

FIELD OF THE INVENTION

The present invention relates generally to improving energy efficiency of heating, ventilating, and air-conditioning systems. More particularly, the present invention relates to systems, devices and methods for improving efficiencies of over-sized heating, ventilating, and air-conditioning systems by controlling and extending cyclical run times of the systems.

BACKGROUND OF THE INVENTION

Electric utilities need to match generation to load, or supply to demand. Traditionally, this is done on the supply side using Automation Generation Control (AGC). As loads are added to an electricity grid and demand rises, utilities increase output of existing generators to solve increases in demand. To solve the issue of continuing long-term demand, utilities typically invest in additional generators and plants to match rising demand. As load levels fall, generator output to a certain extent may be reduced or taken off line to match falling demand. As the overall demand for electricity grows, the cost to add power plants and generation equipment that serve only to fill peak demand becomes extremely costly.

In response to the high cost of peaking plants, electric utility companies have developed solutions and incentives aimed at reducing both commercial and residential demand for electricity. In the case of office buildings, factories and other commercial buildings having relatively large-scale individual loads, utilities incentivize owners with differential electricity rates to install locally-controlled load-management systems that reduce on-site demand. Reduction of any individual large scale loads by such a load-management systems may significantly impact overall demand on its connected grid.

In the case of individual residences having relatively small-scale electrical loads, utilities incentivize some consumers to allow installation of demand-response technology at the residence to control high-usage appliances such as air-conditioning (AC) compressors, water heaters, pool heaters, and so on. Such technology aids the utilities in easing demand during sustained periods of peak usage.

Demand-response technology used to manage thermostatically-controlled loads such as AC compressors typically consists of a demand-response thermostat or a load-control switch (LCS) device. A demand-response thermostat generally controls operation of a load by manipulating space temperature. An LCS device can be wired into the power supply line of the AC compressor or other electrical load, and thereby interrupt power to the load when the load is to be controlled.

However, while the demand-response schemes described above shed demand during peak times, especially for systems utilizing AC units, that demand is often time-delayed and merely pushed to another time along the utility demand timeline. In other words, demand-response schemes are suitable for reducing peak loads, but do not always affect an actual decrease in energy usage. A key problem lies in the energy consumed by AC units typically used in thermostatically-controlled HVAC systems. A majority of the energy consumed by such a system is spent powering the AC compressor. In a recent Environmental Protection Agency report, it was reported that air conditioning accounts for 13% of total home energy expenses on average, and over 20% in hot, humid regions. This statistic is made more significant by the fact that AC units are typically used between three to five months per year, so their effect on the peak demand during summer periods is very significant.

An oversized AC unit exacerbates the problem of high-energy consumption by HVAC systems. The accurate sizing of HVAC equipment, and specifically, the AC unit, is often quite challenging. Many factors contribute to the proper sizing of an AC unit, including the angle at which the sun contacts the home, the type of windows installed in the home, the interior window shading of the windows, the insulation installed in the home, the air circulation patterns, the efficiency of the duct system, and the size of the living space, among others. In addition, those factors change over time as the home and landscaping ages. Because those involved with home construction or AC unit selection, like homeowners and homebuilders, do not want to undersize an AC unit and have to replace the unit later, AC units tend to be oversized. Additionally, oversized units typically provide cooling more quickly, thus avoiding any chance of not meeting the cooling demand of the occupants.

However, the oversizing of AC units contributes to the problem of energy overusage, among other issues. One problem is the short run times of oversized units where the units run for shorter periods of time than are engineered for optimum operation. The efficiency of air conditioners is low when first starting, and increases gradually, reaching peak efficiency in about 10 minutes for most residential AC units. (e.g. long enough for the unit to be running at optimum efficiency). In addition even a properly sized unit will have short run times on days where cooling demand is low.

A number of other problems arise because of short run times. Relatively short operation times followed by relatively long off times do not allow the HVAC system to effectively remove humidity. Improperly dehumidified air adversely effects home comfort, reduces AC cooling efficiency, and can also promote the growth of mold and mildew indoors. Likewise, short run times decrease overall air circulation, resulting in repercussions on air quality and home comfort. Perhaps most importantly, short run times costs homeowners and commercial building owners additional money to operate, as the units are not operating at peak efficiency and reduction in overall life of the unit because the number of AC unit cycles is directly related to a units life (more than just runtime hours).

One attempt at improving the energy-efficiency characteristics of HVAC systems relies on variable speed AC unit compressors and fans that may be used to increase system turndown. However, such technology remains relatively expensive for new HVAC units. Further, retrofitting existing, working HVAC units to replace "single speed" technology with variable speed technology does not provide a convenient nor cost-effective solution for improving energy efficiency.

Another attempt at improving AC system efficiency is described in U.S. Pat. No. 5,960,639 to Hammer, entitled "Apparatus for Regulating Compressor Cycles to Improve Air Conditioning/Refrigeration Unit Efficiency". Hammer discloses methods and systems for addressing compressor short-cycling. Short-cycling occurs when the time between a compressor stopping then restarting is so short that coolant pressures within the HVAC system do not have time to equalize, and the compressor does not have time to cool. Such conditions may occur in undersized HVAC systems, and result in decreased system efficiency. While the invention disclosed by Hammer addresses efficiencies for systems experiencing short-cycling, often in undersized units, or on peak usage days, Hammer fails to address the energy inefficiencies caused by short run times (as opposed to short off times) occurring in oversized AC systems.

Thus, there remains a need for technology capable of reducing energy imposing efficiencies of existing, oversized HVAC systems.

SUMMARY OF THE INVENTION

In an embodiment, the present invention comprises a run time device for extending the time that a heating, ventilating, and air-conditioning (HVAC) system runs so as to increase energy efficiency of the HVAC system. The extended run time device comprises: a sensing circuit adapted to receive a call-for-cool control signal from a temperature control device and output a control signal; a compressor time-extending switching device having a first terminal, a second terminal, and a third terminal, the first terminal adapted to electrically connect to a control circuit, such as a cooling contactor, that controls electrical power to a compressor of an HVAC system, the second terminal adapted to receive the call-for-cool control signal, and the third terminal adapted to receive a proxy call-for-cool control signal, the compressor time-extending switching device configured to selectively connect the first terminal to the second terminal, thereby causing the control circuit to receive the call-for-cool control signal, or to connect the first terminal to the third terminal, thereby causing the control circuit to receive the proxy call-for-cool signal; and a processor in electrical communication with the sensing circuit and the compressor time-extending switching device, the processor adapted to receive the sense signal from the sensing circuit, determine a requested compressor run time based upon the call-for-cool signal, and to transmit a switching control signal to the compressor time-extending switching device, thereby controlling the compressor time-extending switching device; wherein when the requested compressor run time is less than a predetermined minimum compressor run time, the processor transmits the switching control signal to the compressor time-extending switching device, causing the compressor time-extending switching device to disconnect the first terminal from the second terminal, and to connect the first terminal to the third terminal, thereby causing the control circuit to receive the proxy call-for-cool control signal such that the control circuit causes power to be maintained to the compressor for an extended run time period.

In another embodiment, the present invention comprises a method of improving energy efficiency of a heating, ventilating, and air-conditioning (HVAC) system that includes a temperature control device in communication with a compressor, and a circulation fan. The method comprises: monitoring a call-for-cool control signal of a temperature control device, the call-for-cool control signal causing power to be applied to a compressor of an HVAC system for a requested compressor run-time period; determining the duration of the requested compressor run-time period of the temperature control device; comparing the duration of the requested run time period of the temperature control device to a predetermined minimum run-time period; and causing power to the compressor to be maintained for an extended compressor run-time period when the duration of the requested compressor run time period is less than the predetermined minimum run time period, the extended compressor run time period commencing after an expiration of the requested compressor run time period such that the compressor is powered for a total run time period that is greater than the requested compressor run-time period, thereby increasing an energy efficiency of the HVAC system.

In another embodiment, the present invention comprises an extended run time device for extending the time that a compressor-based heating, ventilating, and air-conditioning (HVAC) system runs so as to increase energy efficiency of the HVAC system. The extended run time device comprises: means for monitoring a call-for-cool control signal of a temperature control device, the call-for-cool control signal causing power to be applied to a compressor of the HVAC system for a requested run-time period; means for determining the duration of the requested run-time period of the temperature control device; means for comparing the duration of the requested run time period of the temperature control device to a predetermined minimum run-time period; and means for causing power to the compressor to be maintained for an extended run-time period when the duration of the requested run time period is less than the predetermined minimum run time period, the extended run time period commencing after an expiration of the requested run time period such that the compressor is powered for a total run time period that is greater than the requested run-time period, thereby increasing an energy efficiency of the HVAC system.

In yet another embodiment, the present invention comprises an improved-efficiency heating, ventilating and air-conditioning (HVAC) system. The system comprises: a temperature control device monitoring and controlling a space temperature of a premise and transmitting a call-for-cool control signal; an outdoor unit receiving the call-for-cool control signal transmitted from the temperature control device, the outdoor unit including a compressor and an electrical contactor for switching power on and off to the compressor; and an extended run-time device in electrical communication with the thermostat and the outdoor unit, the extended run-time device receiving the call-for-cool control signal and causing the electrical contactor of the outdoor unit to maintain power to the compressor for an extended run-time period after the temperature control device ceases to transmit the call-for-cool control signal.

BRIEF DESCRIPTION OF THE DRAWINGS

The invention may be more completely understood in consideration of the following detailed description of various embodiments of the invention in connection with the accompanying drawings, in which.

Figure 1:
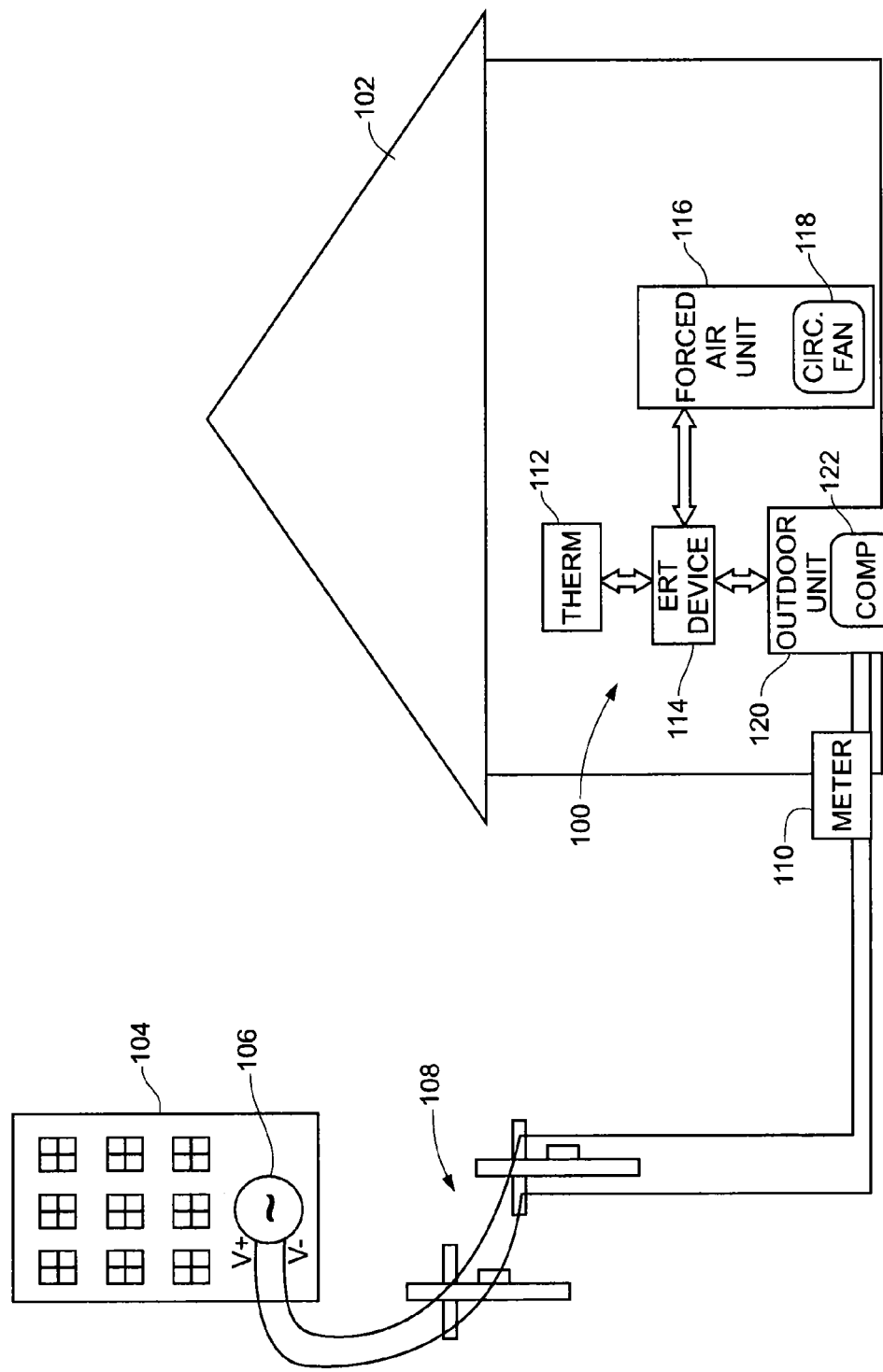
FIG. 1 is a diagram of a premise receiving electricity through an electrical distribution network and having a heating, ventilating, and air conditioning (HVAC) system with an extended run-time (ERT) device, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to FIG. 1, improved-efficiency heating, ventilating, and air-conditioning (HVAC) system 100 is depicted. Improved-efficiency HVAC system 100 is located at premise 102 which receives electricity from electrical utility provider 104.

Premise 102 though depicted as a residential building or home, may also be a commercial building, industrial building, or any such building or structure having an interior space requiring heating or cooling. Though the term "HVAC" is generally understood to mean "heating, ventilating, and air conditioning", it will be understood that improved-efficiency HVAC system 100 may comprise heating and cooling capability, just cooling capability, or just heating capability. As such, when specific reference is made to a cooling configuration and operation, it will be understood that the same configuration and operation may exist and operate as a heating configuration and operation.

Electrical utility provider 104 includes electricity generation equipment 106 connected to electricity transmission and distribution system 108. Electricity is generated by electricity generation equipment 106 at electrical utility provider 104 and transferred to premise 102 via electricity transmission and distribution system 108. Actual electricity consumption at premise 102 may be measured by electricity meter 110.

Electricity meter 110 may be a standard non-communicative device, or may be a "smart meter" tied into an Advanced Meter Infrastructure (AMI) or an electricity "smart grid", capable of communicating with electricity utility provider 104 over a long-haul communication network (not depicted), and in some cases capable of communicating with local devices a short-haul communication network (not depicted) at or near premise 102.

Improved-efficiency HVAC system 100 includes temperature control device 112, extended-run-time (ERT) device 114 of the present invention, forced air unit (FAU) 116 with circulation fan 118, and outdoor unit 120 with compressor 122. Temperature control device 112 is in electrical communication with ERT device 114 and FAU 116; ERT device is in electrical communication with FAU 116 and outdoor unit 120.

Temperature control device 112 may be any of a number of known thermostats or temperature control devices used to regulate a temperature of a space within premise 102. As such, temperature control device 112 may be programmable, non-programmable, digital, mechanical, communicative, and so on. Temperature control device 112 may operate on 24VAC, or another voltage as needed.

FAU 116 includes circulation fan 118, and may also include electrical control circuitry having several electrical terminals, as discussed further below. FAU 116 may be any of several known types of forced air units used to condition and circulate air. FAU 116 may also include heating and cooling elements, filters, dampers, and other related HVAC equipment not depicted. FAU 116 and circulation fan 116 may be connected to ductwork for distributing conditioned air to all or portions of premise 102.

Circulation fan 118 in an embodiment may be a single-speed electric fan located within FAU 116, and turned on and off to move air through premise 102. In other embodiments, circulation fan 124 may be a variable-speed or adjustable-speed fan controlled to vary the rotation speed of the fan, and hence the air volume output of the fan.

Outdoor unit 120 in an embodiment is a condensing unit of an air-conditioning system or HVAC system 100. Outdoor unit 120 includes compressor 122, and as understood by those skilled in the art, generally includes a heat exchanger with condensing coils, a fan, valving, electrical components including a compressor contactor, and so on. Although generally referred to an "outdoor" unit, it will be understood that although condensing units and other such units of an HVAC system are typically located at an exterior of a building, such as premise 102, unit 120 could in some embodiments be located inside premise 102. Further, it will also be understood that while outdoor unit 120 may comprise a condensing unit of an air-conditioning system designed for cooling, outdoor unit 120 may also be a unit of a heat-pump or other such system, providing heating, rather than cooling.

ERT device 114, as described further below with respect to FIGS. 3-5, intercepts communications from temperature control device 112 to FAU 116 and outdoor unit 120 to extend run time of compressor 122 and circulation fan 118.

Although ERT device 114 is depicted as a stand-alone device in FIG. 1, it will be understood that ERT device 114 may alternatively be integrated into a temperature control device 112, load-control switch (LCS), outdoor unit 120, or FAU 116. In one such alternative embodiment, ERT device 114 is combined with temperature control device such as a thermostat, such that the present invention comprises a thermostat including ERT device 114. In another such alternative embodiment, ERT device 114 comprises a portion of a fan control board of FAU 116. In yet another such alternate embodiment, ERT device 114 is integrated into an LCS.

In general operation, air is heated or cooled by improved-efficiency HVAC system 100, and forced through a network of air ducts by circulation fan 118. Based upon a temperature set point at temperature control device 112, a thermostat calls for heating or cooling based on feedback from a temperature sensor within the conditioned space of premise 102. In the case of cooling, the temperature control device 112 signals or requests compressor 122 to turn on, and for circulation fan 118 to circulate cooled air through the ductwork to various points about premise 102. When a temperature set point is reached, temperature control device 112 ceases signaling compressor 122, and eventually fan 118, to run. When the space temperature rises, temperature control device 112 again calls for cool, and the process repeats.

For a single on-off cycle, the time that the compressor is powered and actually runs will generally be referred to as the "run time" and the time that the compressor is not powered, and therefore not running, will generally be referred to as the "off time".

Figure 2:
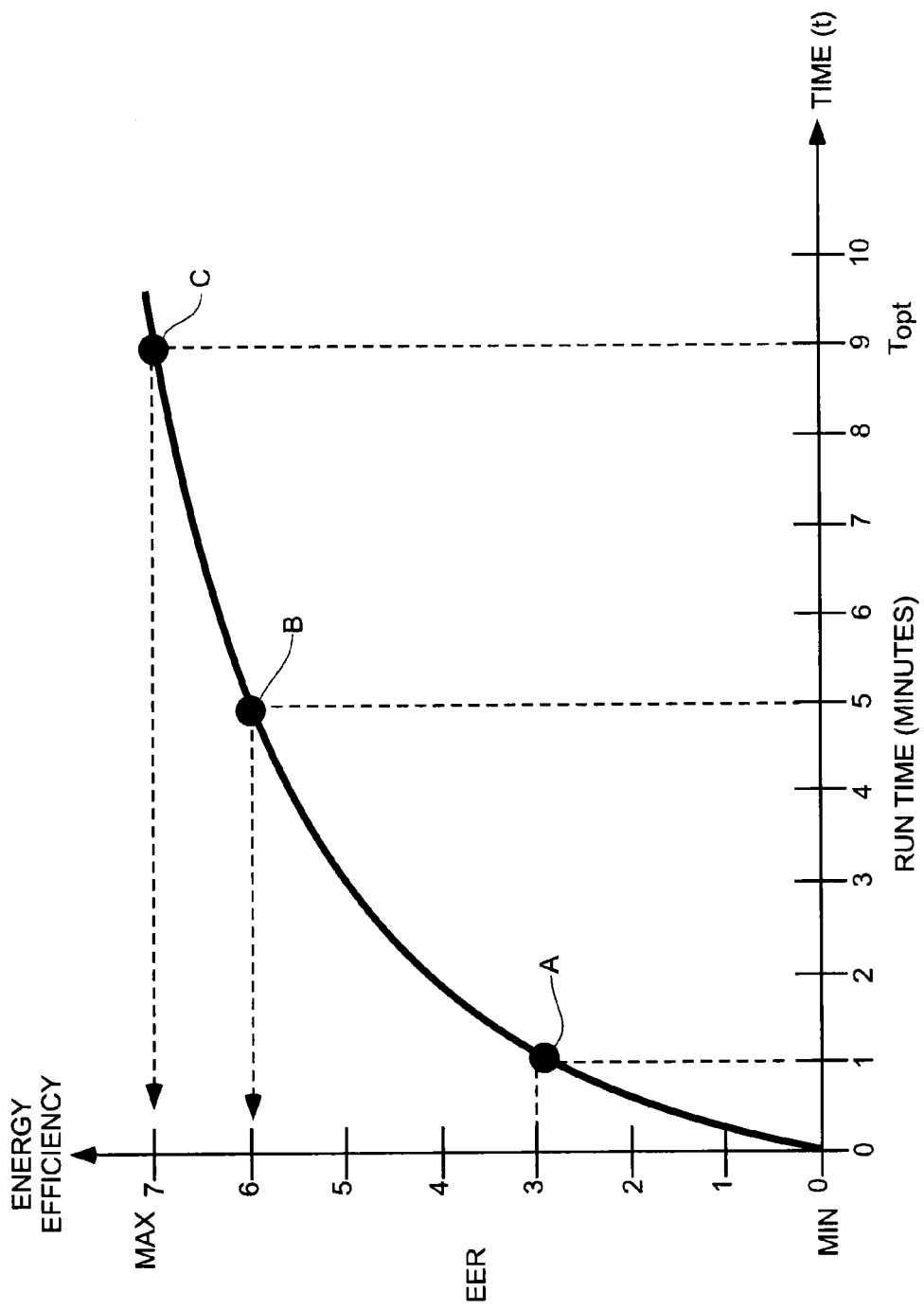
FIG. 2 is an HVAC efficiency versus run time chart for an exemplary HVAC system.

Referring to FIG. 2, a theoretical efficiency versus run time chart for an exemplary HVAC system is depicted. The vertical axis of the chart represents a range of system energy efficiency ratings (EER) ranging from "Min" for minimum efficiency to "Max" for maximum efficiency. The horizontal axis of the chart represents system run time in minutes. In this depicted example chart, energy efficiency ranges from 0 to 7 EER, while time ranges from 0 to 10 minutes.

Three points, Point A, Point B, and Point C are also depicted on the EER vs. Run Time chart of FIG. 2. At Point A, after 1 minute, the system efficiency rating is 3 EER; at Point B, after running 5 minutes, the system efficiency has improved to 6 EER; and at Point C, after running 9 minutes, which may be considered an optimal amount of time, or Topt, system efficiency is maximized at 7 EER.

Although the depicted EER v. Run Time chart is only an example of performance of a particular, theoretical HVAC system, the chart illustrates the general concept that when a compressor-based HVAC system begins to operate, system efficiency may be rather low, then, after some time has passed, energy efficiency increases non-linearly to its maximum after a period of time.

In the chart depicted in FIG. 2, at time t=9 minutes, system energy efficiency is maximized. Such a time is referred to as Topt. For the portion of time that HVAC system runs beyond Topt, 9 minutes for the example depicted in the chart of FIG. 2, the system will generally operate at maximum system efficiency.

Consequently, in an HVAC system where a compressor is regularly cycled on and off, such as improved-efficiency HVAC system 100 of the present invention, it is generally desirable to size and operate the system such that the system runs for at least a minimum run time Tmin which in some embodiments may be equal to Topt, so as to maximize energy efficiency.

However, in an oversized system, one with excess cooling or heating capacity, or even in a "right-sized" system when temperatures are not extremely hot, the system may run for significantly less time than Topt. ERT device 114 provides a solution for improving the efficiency of such an oversized HVAC system by increasing minimum system run time Tmin to approach Topt.

Figure 3:
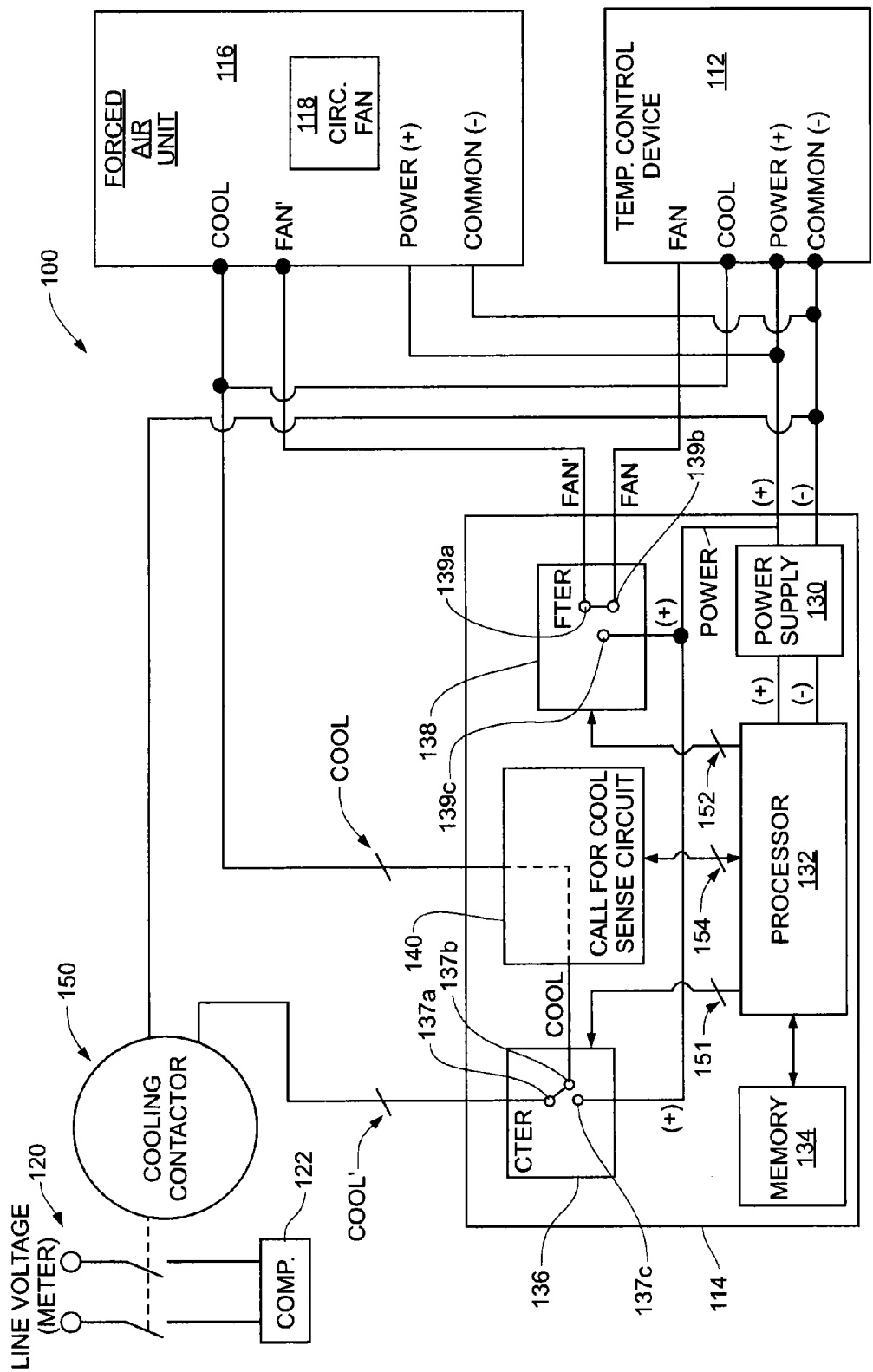
FIG. 3 is a block diagram of the HVAC system with the ERT device of FIG. 1, in a pre-extension mode, according to an embodiment of the present invention.

Referring to FIG. 3, a block diagram of improved-efficiency HVAC system 100 and ERT device 114 is depicted.

In the embodiment depicted, ERT device 114 includes power supply 130, processor 132, memory 134, compressor time-extending switching device 136, circulation fan time-extending switching device 138 and call-for-cool sensing circuit 140.

Power supply 130, receives power from an external power source, such as from FAU 116, and as understood by those skilled in the art, conditions the power to provide an appropriate power to processor 132 and other components of ERT device 114 as needed. In an embodiment, power supply 130 receives a 24VAC power via the POWER and COMMON terminals of FAU 116. In other embodiments, power supply 130 may receive a 120VAC or other such power as is locally available.

Processor 132 may comprise a central processing unit, microprocessor, microcontroller, microcomputer, or other such known computer processor. Processor 132 is in communication with memory 134, compressor time-extending switching device 136, fan time-extending switching device 138 and call-for-cool sensing circuit 140.

More specifically, processor 132 is in communication with compressor time-extending switching device 136 by way of compressor time-extending relay control line 151; with fan time-extending relay 138 by way of fan time-extending relay control line 152; and with call-for-cool sensing circuit 140 by way of call-for-cool control line 154.

Memory 134, which may be a separate memory device or memory device integrated into processor 132, may comprise various types of volatile memory, including RAM, DRAM, SRAM, and so on, as well as non-volatile memory, including ROM, PROM, EPROM, EEPROM, flash, and so on. Memory 134 may store programs, software, and instructions relating to the operation of ERT device 114.

Compressor time-extending switching device 136 comprises an electrically operated switch, which in an embodiment comprises a relay, which may be normally-closed single-pole, double throw relay switch. Compressor time-extending switching device 136 may also comprise other types of switching devices, in addition to any of various types of known relays.

In an embodiment, compressor time-extending switching device 136 comprises a switching device of a load-control switch (LCS). As understood by those skilled-in-the-art, an LCS is used as part of a demand-response (DR) system of an electrical utility. An electrical utility selectively controls power delivery to a device, such as a compressor 122, typically by switching a device, such as a relay or other switch, including switching device 136, on and off as needed to shed load and reduce electrical demand. In an embodiment, ERT 114 components and/or functionality may be integrated into such an LCS. In such an embodiment, the LCS and ERT device 114 may also comprise a communications module for communicating with an electrical utility 104. The communications module may include a receiver, transmitter, antenna, memory, and so on, for data transmission over a local and/or long-haul communications network, such as an RF, paging, AMI, or cellular network.

In an embodiment, compressor time-extending switching device 136 includes first terminal 137a, second terminal 137b, and third terminal 138c. First terminal 137a electrically connects to a terminal of control circuit 150, which in an embodiment comprises a cooling contactor. Second terminal 137b electrically connects to control line COOL to receive the call-for-cool control signal from temperature control device 112. Third terminal 137c is electrically connected to a terminal or an output of power supply 130 via power line POWER.

Compressor time-extending switching device 136 toggles compressor control line COOL' and first terminal 137a between second terminal 137b and call-for-cool line COOL as received from temperature control device 112 via call-for-cool sensing circuit 140, and third terminal 137c and power line POWER as received from FAU 116 and/or temperature control device 112. Compressor time-extending switching device 136 receives, and is driven by, a control signal received from processor 132 via control signal line 151.

Fan time-extending switching device 138, similar to compressor time-extending switching device 136, comprises an electrically operated switch, which in an embodiment comprises a relay, such as a normally-closed single-pole, double throw relay switch. Fan time-extending switching device 138 may also comprise other types of switching devices, in addition to any of various types of known relays.

In an embodiment, fan time-extending switching device 138 includes first terminal 139a, second terminal 139b, and third terminal 139c. First terminal 139a electrically connects to terminal FAN' of FAU 116. Second terminal 139b electrically connects to control line FAN to receive the call-for-fan control signal from temperature control device 112. Third terminal 139c is electrically connected to a terminal or an output of power supply 130 via power line POWER.

Fan time-extending switching device 138 toggles first terminal 139a and control line FAN' between second terminal 139b and call-for-fan line FAN as received from temperature control device 112, and third terminal 139c and power line POWER as received from FAU 116 and/or temperature control device 112. Fan time-extending switching device 138 is driven by a fan control signal received from processor 132 via control signal line 152.

In an alternate embodiment, ERT device 114 may not include a fan time-extending switching device 138, and rather relies on programming within temperature control device 112 to control fan operation.

Call-for-cool sensing circuit 140 in an embodiment comprises a trigger sense circuit, such as a Schmitt trigger. Call-for-cool circuit 140 senses the presence or absence of a call-for-cool control signal at line COOL as provided by temperature control device 112. In an embodiment, call-for-cool sense circuit is a trigger sense circuit sampling the call-for-cool control line COOL on a periodic basis to determine whether temperature control device 112 is calling for compressor 122 to operate so as to cool premise 102. As described above, temperature control device 112 may utilize a 24VAC control logic such that call-for-cool control line COOL goes "high" to 24VAC when temperature control device 112 calls for cool, and "low" or ground/common when not calling for cool. Call-for-cool sensing circuit 140 regularly samples signal COOL such that processor 132 can determine when temperature control device 112 is calling for cool, i.e., for compressor 122 to run.

As depicted in FIG. 3, compressor time-extending switching device 136 and fan time-extending switch 138 hold switch positions such that compressor 122 is in electrical communication with the COOL output (call-for-cool signal) at temperature control device 112 through control circuit 150, and forced air unit 116 and its circulation fan 118 are electrically connected to call-for-fan terminal FAN (call-for-fan signal) at temperature control device 112. In such a configuration, ERT device 114 allows temperature control device 112 to control compressor 122 and circulation fan 118.

Therefore, with switching devices 136 and 138 configured as shown, in operation, when temperature control device 112 senses that a space temperature of premise 102 has fallen below a set point temperature, temperature control device 112 outputs a "high" control voltage at terminals COOL and FAN, which are received, respectively, by control circuit 150 of outdoor unit 120 and circulation fan 118 of forced air unit 116.

Consequently, control circuit 150 upon receiving the call-for-cool signal from temperature control device 112 switches line voltage on to compressor 122. In an embodiment, control circuit 150 is a contactor relay or other similar switch that switches line voltage on and off compressor 122 based on a received control signal, such as COOL'. The contactor may be one of many known contactors or other known controlling devices for switching the power of compressor 122, wherein compressor 122 may be an air-conditioning compressor, heat pump, or other such generally high-current-load device of a heating or cooling circuit. Control circuit 150 may operate on alternating current (AC) or direct current (DC), and at a control circuit voltage appropriate for the particular control circuit, such as 24VAC.

Line voltage providing power to compressor 122 may be any of known voltages available to compressor 122. In the United States, in a residential application, line voltage is often 240VAC.

Although system 100 is depicted as switching compressor 122 on and off via control circuit 150, in other embodiments, other switching configurations may be utilized. In one such alternate embodiment, ERT device 114 outputs line voltage for use by compressor 122.

Further, it will be understood that wherein compressor 122 provides heat for a system 100 that may comprise a heat pump, operation is generally the same, except that a call for heat is substituted for a call for cool.

While temperature control device 112 calls for cool via terminal COOL, and generally for fan via terminal FAN, call-for-cool sensing circuit 140 monitors call-for-cool line COOL and provides data to processor 132. In an embodiment, call-for-cool sensing circuit 140 continuously samples COOL at a predetermined rate. In one embodiment, the sampling frequency or rate is one sample every ½ second. If greater accuracy is desired, the sampling rate may be decreased, and for lesser accuracy, the sampling rate increased.

Processor 132 receives a signal representing call-for-cool data from call-for-cool sensing circuit 140 at control line 154 and determines the time period that temperature control device 112 calls for cool, or requested compressor "run time" for each on and off cycle. As described further below with respect to FIG. 5, processor 132 then determines whether to allow compressor 122 to be turned off when temperature control device 112 stops calling for cool (generally at a point when the space temperature is at or below the desired temperature set point in the case of cooling), or to extend the run time of compressor 122, and in some embodiments the run time of circulation fan 118, thereby increasing efficiency of system 100 and compressor 122.

Figure 4:
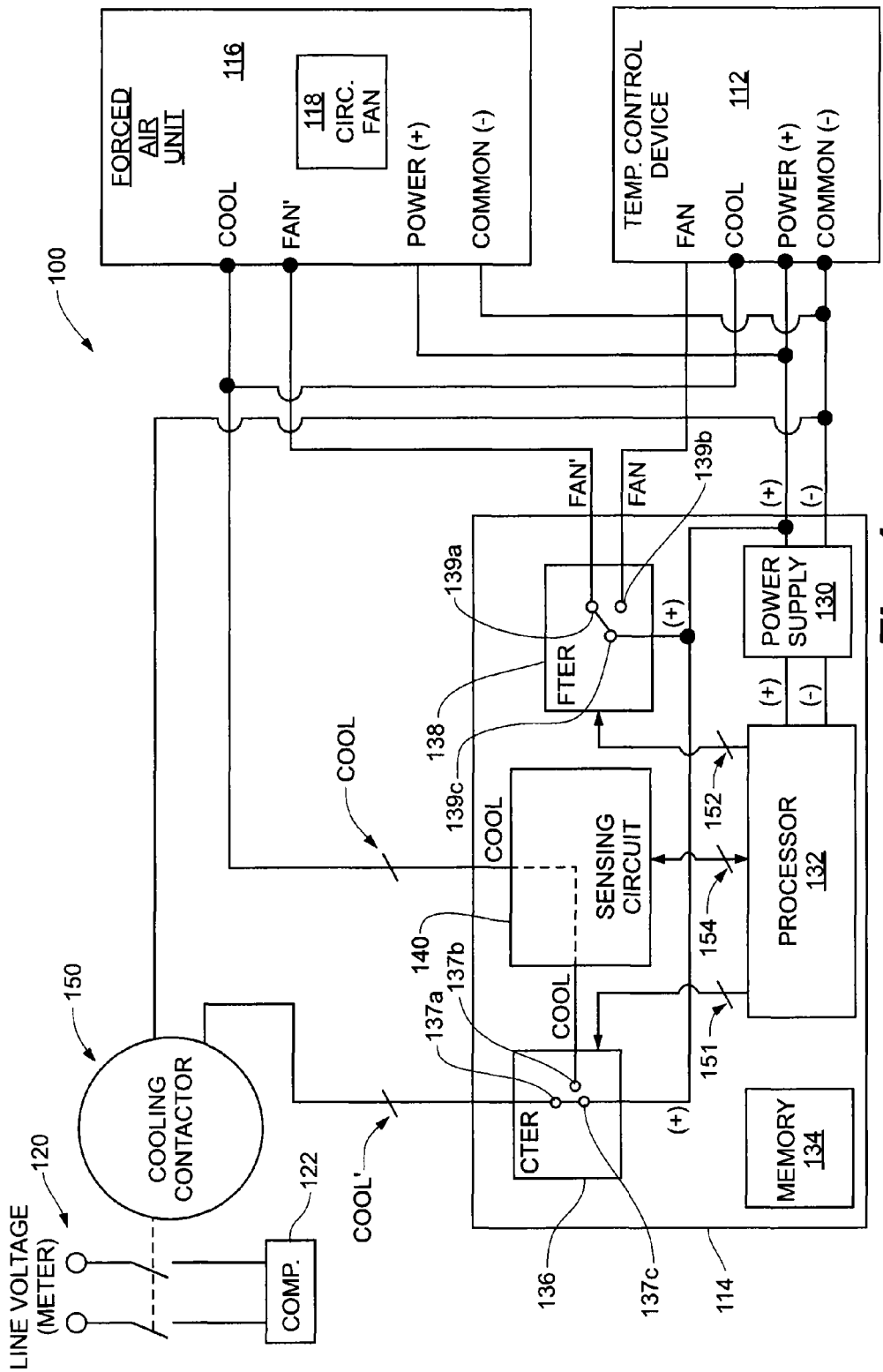
FIG. 4 is the block diagram of the HVAC system and ERT device of FIG. 3, in an extension mode.

Referring to FIG. 4, if processor 132 determines that a requested run time of compressor 122 and/or fan 118 should be extended, when call-for-cool signal COOL as provided by terminal COOL of temperature control device 112 stops calling for cool, which in an embodiment means switching from a high control voltage of 24VAC to low control voltage, processor 132 delivers a control signal to compressor time-extending switching device 136 via line 151, causing switching device 136 to switch.

More specifically, compressor time-extending switching device 136 switches such that first terminal 137a no longer is connected to second terminal 137b, but rather, is connected to third terminal 137c. As such, call-for-cool line COOL', which controls operation of compressor 122, switches from COOL to POWER. Consequently, when temperature control device 112 stops calling for cool and reduces the control voltage at COOL to low, processor 132 causes relay 136 to connect compressor call-for-cool line COOL' to a constant logic high source, POWER. This constant logic high source may be considered a "proxy" call-for-cool signal in that the signal received at call-for-cool line COOL' is electrically equivalent, or substantially similar, to the call-for-cool signal output from temperature control device 112. The result is that compressor 122 continues to receive a control signal indicating that control circuit 150 should continue to power compressor 122 even after temperature control device 112 stops calling for cool.

Similarly, processor 132 may also extend the operation of circulation fan 118.

In most HVAC systems, a circulation fan operates for a period of time after the compressor is turned off. During this incremental period of time that the fan runs and the compressor does not, air is circulated over the evaporator coils of the system, providing some additional cooling/heating effect, and also lowering humidity levels of the circulated air. To maintain this "normal" operation of the fan running for a period of time after the compressor is turned off, system 100 of the present invention also extends operation of circulation fan 118 beyond the time that compressor 122 is turned off.

As described above, during normal operation, temperature control device 112 will generally call for circulation fan 118 to operate while compressor 122 is operating. As such, when temperature control device 112 calls for cool, it also generally calls for fan 118 to run. If processor 132 extends operation of compressor 122, in an embodiment, it also extends operation of circulation fan 118. Similar to the operation of compressor time-extending switching device 136, processor 132 provides a control signal via fan control signal line 152 to fan time-extending switching device 138 causing relay 138 to switch call-for-fan control line FAN' (first terminal 139a) from FAN (second terminal 139b) to POWER (third terminal 139c). Consequently, even though temperature control device 112 stops calling for fan, forced air unit 116 and its circulation fan 118 continue to receive a call for fan via fan time-extending switching device 138.

In an embodiment, processor 132 extends the operation of circulation fan 118 whenever processor 132 extends the operation of compressor 122. In such an embodiment, the duration of the extended call-for-fan time period may be equal to or greater than the duration of the extended call-for-cool time period. In another embodiment, operation of circulation fan 118 may be extended independent of any extension of the operation of compressor 122.

In climates having low humidity and high heat, it may be especially beneficial to extend operation of fan 118 to obtain additional cooling benefits, and to remove condensate from evaporator coils. Referring also to FIG. 2, the objective of extending the total run time of compressor 122 and circulation fan 118 is to operate these components of improved-efficiency HVAC system 100 for a period of time that improves system efficiency. For example, if HVAC system 100 was operating at point A on the chart of FIG. 2 (Run Time of 1 minute and EER of 3), perhaps due to oversizing of the system, ERT device 114 may cause a minimum run time Tmin of system 100, by way of compressor 122 and generally fan 118, to be increased such that system 100 operates at Point B (minimum run time of 5 minutes, EER of 6) or at Point C (minimum run time of 9 minutes, which is equal to Topt, EER at maximum of 7).

As described further below, ERT device 114 may increase or extend run time to force system 100 to operate at maximum efficiency, for example, at Point C, or at other points less than maximum efficiency, for example, Point B. Such an extension of the run time may be brought about by gradual increases in run time until a desire run time is achieved. Further, if ERT device 114 detects that temperature control device 112 already is operating for a period of time as requested by temperature control device 112 and above a minimum run time, such as Topt, ERT device 114 may not extend the run time further.

In an embodiment, minimum run time, Tmin, is simply the predetermined total amount of time that compressor 122 and HVAC system 100 needs to run in a single on/off cycle in order to operate at maximum system efficiency. In another embodiment, minimum run time is less than the amount of time that compressor 122 and HVAC system 100 needs to run in order to operate at maximum system efficiency. In other words, for a single cycle, compressor 122 runs for a period of time that is less than that which would result in optimum efficiency, but still improves system efficiency.

Figure 5:
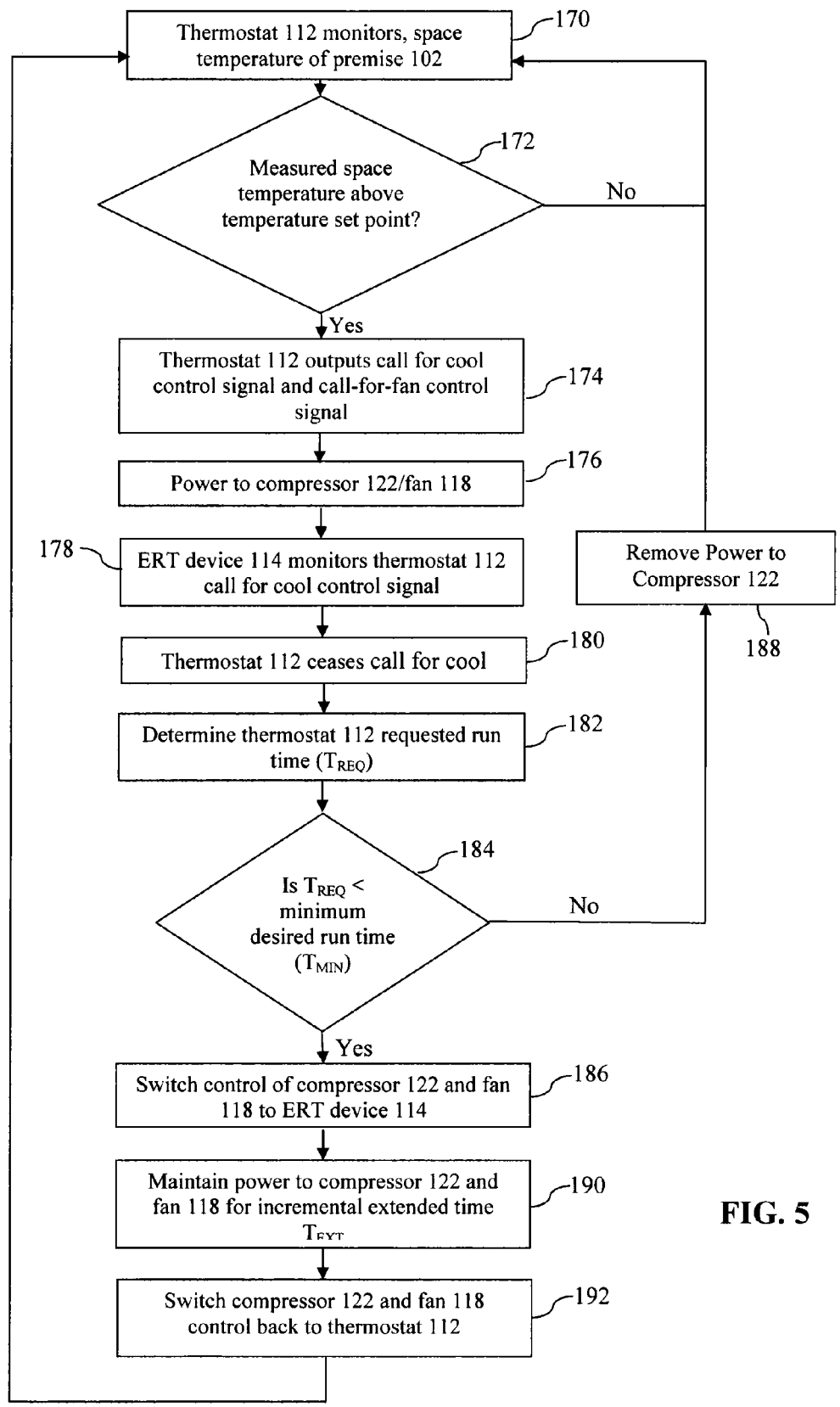
FIG. 5 is a flow chart of a method of extending an HVAC system run time for improving system energy efficiency, according to an embodiment of the present invention.

Referring to FIG. 5, a flowchart depicting the steps for determining and implementing an extended system run time is depicted. More specifically, the flowchart of FIG. 5 depicts the steps for extending system run time for a cooling system over a single operating cycle (one run time period followed by an off time period). It will be understood that these steps may also apply to a heating system. In such a method, a "call for heat" control signal, rather than a call for cool control signal may be implemented, with temperature control device 112 calling for heat when a space temperature falls below a predetermined set point, rather than above.

At step 170, temperature control device 112 monitors a space temperature of premise 102.

At step 172, if a measured space temperature is above a predetermined temperature set point, at step 174, temperature control device 112 outputs a call-for-cool control signal. It will be understood that temperature control device 112 may be programmed or otherwise configured to allow a space temperature to rise by a predetermined amount above the desired temperature set point so as to prevent frequent cycling of HVAC system 100. For example, despite a temperature set point of 72° F., the space temperature may be allowed to rise to 72.5° F. or 73° F., before temperature control device 112 calls for cool.

At step 172, if the measured space temperature is at or below the predetermined temperature set point, temperature control device 112 continues to monitor the space temperature at step 170.

At step 174, temperature control device 112 outputs a call-for-cool control signal. Referring also to FIG. 3, in an embodiment, temperature control device 112 outputs a 24VAC control signal (call-for-cool control signal) at terminal COOL of temperature control device 112, which is received by ERT device 114 at call-for-cool sensing circuit 140. Alternatively, in an HVAC system 100 that provided heat via compressor 122, temperature control device 112 would similarly output a call-for-heat control signal which would be received by a call-for-heat sensing circuit 140 of ERT device 114.

In an embodiment, temperature control device 112 also outputs a call-for-fan control signal. One such embodiment is depicted in FIG. 3, wherein temperature control device 112 outputs a call-for-fan control signal of 24VAC at terminal FAN, which is then received by ERT device 114 at fan time-extending switching device 138, and conveyed to FAU 116.

At step 176, and as described above with respect to FIG. 3, the call-for-cool control signal results in power being applied to compressor 122, such that compressor 122 begins to run. In an embodiment such as one depicted in FIG. 3, the call for cool is conveyed to control circuit 150, which causes a relay within control circuit 150 to connect line voltage to compressor 122, causing it to begin running.

Further, the call-for-fan control signal is received at FAU 116, which causes circulation fan 118 to begin to operate, and circulate air cooled by compressor 122 through system 100.

At step 178, ERT device 114 monitors the call-for-cool control signal output by temperature control device 112. In an embodiment, call-for-cool sensing circuit 140 samples the call-for-cool signal output to determine whether the call-for-cool control signal is "high" or "low", or in other words, whether temperature control device 112 is calling for cool. In one such embodiment, and as described above, call-for-cool sense circuit samples the voltage at signal line COOL (equivalent to terminal COOL of temperature control device 112) at a predetermined frequency. Call-for-cool sensing circuit 140 transmits over line 154 sampled data or data representative of the sampled data to processor 132.

Processor 132 receives the sampled data representing the call-for-cool control signal. Processor 132 uses the call-for-cool control signal data to determine how long temperature control device 112 has been calling or requesting cool, and hence how long compressor 122 has been running. Such a calculation may be calculated and updated continuously such that a new compressor run time is calculated with each new data sample received, or a single compressor run time may be calculated when temperature control device 112 ceases to call for cool.

At step 180, temperature control device 112 ceases to call for cool. Generally, this is a result of a space temperature reaching a desired temperature set point, such compressor 122 would normally be turned off.

At step 182, temperature control device 112 determines the period of time that temperature control device 112 was calling for cool, the requested compressor run time $T_{REQ}$. For example, if temperature control device 112 called for cool such that call-for-cool control signal line COOL was at 24VAC for 5 minutes, then stopped calling for cool such that COOL dropped to 0VAC, processor 132 would determine based upon sampled data received from call-for-cool sensing circuit 140, that requested compressor run time $T_{REQ}$ was 5 minutes.

In an embodiment, a single occurrence of a change in control voltage from high to low at signal line COOL will identify an end of the time period $T_{REQ}$. In another embodiment, a change in control voltage must be sustained for a minimum period of time, or sampling periods.

After determining the requested compressor run time $T_{REQ}$ at step 182, processor 132 compares $T_{REQ}$ to a predetermined desired run time $T_{MIN}$ at step 184. If $T_{REQ}$ is not less than a predetermined desired run time $T_{MIN}$, i.e., is equal to or greater than $T_{MIN}$, power is removed from compressor 122 at step 188, and temperature control device 112 continues to monitor the space temperature of premise 102 at step 170. In such a condition, namely, when $T_{REQ}$ is equal to or greater than $T_{MIN}$, compressor 122 and system 100 is operating at a sufficient efficiency level such that no intervention in the form of an extended run time, is required.

If at step 184 processor 132 determines that $T_{REQ}$ is less than a predetermined desired run time $T_{MIN}$, then control of compressor 122 and fan 118 is switched over to ERT device 114 at step 186.

At step 190 power to compressor 122 and fan 118 is maintained, causing compressor 122 and fan 118 to continue running, thereby extending the run time of compressor 122 and fan 118. The additional run time above the requested run time $T_{REQ}$ is defined as extended run time $T_{EXT}$, such that a total run time $T_{TOT}$ is the sum of $T_{REQ}$ and $T_{EXT}$. Generally, $T_{TOT}$ will be equal to $T_{MIN}$.

The additional extended run time $T_{EXT}$ may be different for compressor 122 and fan 118. In an embodiment, fan 118 continues to run after power is removed from compressor 122. In such an embodiment, fan 118 $T_{EXT}$ is greater than compressor 122 $T_{EXT}$. Extending the run time for either compressor 122 or fan 118 is described above with respect to FIGS. 3 and 4.

At step 192, at the end of the extended run time period $T_{EXT}$, control of compressor 122 and fan 118 is returned to temperature control device 112. As described above with respect to FIGS. 3 and 4, in an embodiment, this step is accomplished when processor 132 causes compressor time-extending switching device 136 to connect compressor control line COOL' to temperature control device 112 output COOL, and when processor 132 causes fan time-extending switching device 138 to connect control line FAN' to temperature control device 112 output FAN. In such an embodiment, temperature control device 112 then controls operation of compressor 122 and circulation fan 118.

In the case of a cooling system 100, when control is turned over to temperature control device 112 at the end of the extend run time period $T_{EXT}$, temperature control device 112 will generally not be calling for cool or fan because compressor 122 and fan 118 have been operating. In such a case, a control voltage at COOL' and FAN', as output from temperature control device 112, will be low, and power to compressor 122 and fan 118 will be removed.

Subsequently, temperature control device 112 will continue to monitor the space temperature of premise 102 at step 170, and the cycle begins again.

With respect to the duration of extended time period $T_{EXT}$, in an embodiment, $T_{EXT}$ is simply as follows:

$$T_{EXT} = T_{MIN} - T_{REQ} \qquad \text{EQN 1:}$$

In such an embodiment, processor 132 dynamically determines $T_{EXT}$ based on the previous operating cycle, or a combination of previous operating cycles, such that compressor 122 and/or fan 118 always runs for at least the predetermined minimum time period $T_{MIN}$. As described above, $T_{MIN}$ may be selected based on an overall desired efficiency of system 100, or compressor 122. If optimum efficiency is desired, $T_{MIN}$ will generally be equal to $T_{OPT}$.

Referring again to FIG. 2, in an embodiment, an HVAC system 100 has a maximum energy efficiency rating of 7 at a run time equal 9 minutes. The run time of 9 minutes is defined as the optimal run time $T_{OPT}$. If system 100 is oversized with respect to premise 102 such that system 100 and compressor 122 generally run less than the optimal run time $T_{OPT}$ of 9 minutes, then the run time is extended using ERT device 114.

In such an embodiment, a predetermined minimum run time $T_{MIN}$ may be set equal to $T_{OPT}$, or 9 minutes, such that system 100 operates at Point C as depicted in FIG. 2. Alternatively, $T_{MIN}$ may be set to another run time less than $T_{OPT}$, which in an embodiment is 5 minutes, corresponding to Point B in FIG. 2, and having an EER of 6. As such, $T_{MIN}$ may be a predetermined time period that causes compressor 122 to operate anywhere along the EER vs. run time curve, thusly improving the efficiency of system 100 and compressor 122 in any increment.

Forcing compressor 122 and circulation fan 118 to operate longer than requested by temperature control device 112 not only improves system 100 efficiency, but also improves humidity control and air mixing by allowing fan 118 to operate for longer periods of time.

However, extending the run time of compressor 122 and circulation fan 118 to achieve improved efficiency may cause a space temperature of premise 102 to fall below (cooling) or rise above (heating) a desired temperature set point. Generally, the greater the extended run time $T_{EXT}$ as compared to the requested run time $T_{REQ}$, the greater the variation in temperature below or above the desired temperature set point. Such temperature variations may become noticeable to a person within premise 102.

To illustrate this relationship, referring again to FIGS. 1 and 2, in an embodiment, an oversized system 100 operates without an ERT device 114 at Point A, such that temperature control device 112 request that compressor 122 run for only 1 minute every cycle in order to hold a desired temperature set point at a space of premise 102. System 100 efficiency may be improved by extending compressor 122 run time by $T_{EXT}$ to move operation of system 100 along the curve depicted in FIG. 2. If $T_{MIN}$ is set to 9 minutes for maximum system efficiency, $T_{EXT}$ is equal to 8 minutes, causing compressor 122 to run for 9 minutes total, rather than 1 minute.

However, temperature control device 112 requested a 1 minute run time based on the amount of time needed, or cool air volume needed, to cool premise 102 to the desired temperature set point. If system 100 continues to operate for 8 minutes beyond what is required to meet the temperature set point needs, a space temperature of premise 102 will fall well below the desired temperature set point. Some persons may find such temperature swings noticeable and uncomfortable.

One solution is to set a minimum run time $T_{MIN}$ to be less than an optimal run time $T_{OPT}$. $T_{EXT}$ is still determined based on EQN. 1 above, but will have a shorter duration when $T_{MIN}$ is less than $T_{OPT}$.

In an embodiment, a user or on-site technician initially sets $T_{MIN}$ to be at $T_{OPT}$, then adjusts $T_{MIN}$ downward until temperature variations resulting from system 100 turning on and off are acceptable based on user perception.

In another embodiment, other criteria may be used to manually or automatically determine either a minimum run time $T_{MIN}$ or an extended run time $T_{EXT}$. In one such embodiment, $T_{EXT}$ may be defined as a multiple of $T_{REQ}$ as follows:

$$T_{EXT} = M \times T_{REQ}, \qquad \text{EQN 2:}$$

Wherein "M" is predetermined multiplier used to determine $T_{EXT}$.

Alternatively, $T_{EXT}$ may be capped such that $T_{TOT}$ does not exceed $T_{OPT}$, so as to maximize efficiency, but minimize temperature variation in premise 102. In such an embodiment, $T_{EXT}$ may be defined by the following two equations:

$$T_{EXT} = \text{Min}(M \times T_{REQ}, T_{OPT} - T_{REQ}) \text{ for } T_{REQ} < T_{OPT} \qquad \text{EQN. 3:}$$

and $$T_{EXT} = 0 \text{ for } T_{REQ} \geq T_{OPT} \qquad \text{EQN. 4:}$$

Theoretical exemplary run time data of an embodiment of system 100 with ERT 114 and having a fixed multiplier M and $T_{EXT}$ calculated per EQNS. 3 and 4, is described in Table 1 below, with all run times in minutes, and based on the exemplary efficiency curve depicted in FIG. 2:

TABLE 1

| Requested Run Time ($T_{REQ}$) | Optimal Efficiency Run Time ($T_{OPT}$) | Initial EER | Multiplier (M) | Extended Run Time ($T_{EXT}$) | Total Run Time ($T_{TOT} = T_{REQ} + T_{EXT}$) | Improved EER |
|---|---|---|---|---|---|---|
| 1 | 9 | 3 | 0.5 | 0.5 | 1.5 | 3.5 |
| 3 | 9 | 4.7 | 0.5 | 1.5 | 4.5 | 5.5 |
| 5 | 9 | 6 | 0.5 | 2.5 | 7.5 | 6.5 |
| 7 | 9 | 6.4 | 0.5 | 2 | 9 | 7 |
| 9 | 9 | 7 | 0.5 | 0 | 9 | 7 |
| 12 | 9 | 7 | 0.5 | 0 | 12 | 7 |

Table 1 may characterize a range of requested run times $T_{REQ}$ for a single system 100 or compressor 122, that vary with cooling or heating loads. In the embodiment of system 100 with ERT 114 characterized by the theoretical data of Table 1, multiplier M is held constant at 0.5. In such an embodiment, requested run time for a system 100 may change as depicted in Table 1, ranging from 1 minute to 12 minutes. Multiplier M is held constant, regardless of run time. $T_{EXT}$ is determined by processor 132 according to EQNS. 3 and 4. Total run time $T_{TOT}$ is increased as shown, and system efficiencies improved.

In an alternate embodiment, multiplier M may be dynamically determined by processor 132 based on measured requested run time $T_{REQ}$. In one such embodiment, multiplier M varies inversely to requested run time $T_{REQ}$. In such an embodiment, M is generally larger for shorter requested run times $T_{REQ}$, and smaller for longer requested run times $T_{REQ}$. Multiplier M may be associated with a particular range of requested run times $T_{REQ}$, such as M=2 for requested run times $T_{REQ}$ that are less than 3 minutes; M=1 for requested run times $T_{REQ}$ that are equal to or greater than 3 minutes, but less than 5 minutes, and so on. Such an embodiment provides the benefit of increasing total run times $T_{TOT}$ for particularly low requested run times $T_{REQ}$.

Theoretical exemplary run time data of an embodiment of system 100 with ERT 114 and having a dynamic multiplier M and $T_{EXT}$ calculated per EQNS. 3 and 4, is described in Table 2 below, with all run times in minutes, and based on the exemplary efficiency curve depicted in FIG. 2:

TABLE 2

| Requested Run Time ($T_{REQ}$) | Optimal Efficiency Run Time ($T_{OPT}$) | Multiplier (M) | Initial EER | Extended Run Time ($T_{EXT}$) | Total Run Time ($T_{TOT} = T_{REQ} + T_{EXT}$) | Improved EER |
|---|---|---|---|---|---|---|
| 1 | 9 | 2 | 3 | 2 | 3 | 4.7 |
| 3 | 9 | 1 | 4.7 | 3 | 6 | 6.4 |
| 5 | 9 | 0.5 | 6 | 2.5 | 7.5 | 6.6 |
| 7 | 9 | 0.5 | 6.4 | 2 | 9 | 7 |
| 9 | 9 | 0.5 | 7 | 0 | 9 | 7 |
| 12 | 9 | 0.5 | 7 | 0 | 12 | 7 |

As depicted in Table 2, multiplier M varies inversely with requested run time $T_{REQ}$. At a requested run time $T_{REQ}$ of 1 minute, multiplier M is relatively large at M=2, so as to provide a relatively larger extended run time $T_{EXT}$. Multiplier M decreases as requested run time $T_{REQ}$ approaches $T_{OPT}$.

It will be understood that other embodiments of the present invention may include alternate algorithms for determining extended run time $T_{EXT}$ and multiplier M, based upon the principles of extending compressor run time so as to increase efficiency, with minimal temperature variation and possible discomfort at a premise 102.

Although the present invention has been described with respect to the various embodiments, it will be understood that numerous insubstantial changes in configuration, arrangement or appearance of the elements of the present invention can be made without departing from the intended scope of the present invention. Accordingly, it is intended that the scope of the present invention be determined by the claims as set forth.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An extended run-time device for extending the time that a compressor-based heating, ventilating, and air-conditioning (HVAC) system runs so as to increase energy efficiency of the HVAC system, the extended run-time device comprising:

a temperature control device configured to generate a call-for-cool control signal having a first logic state for the duration of a requested compressor run time, the call-for-cool control signal having a second logic state after the requested compressor run time has elapsed;

a power supply configured to generate a proxy call-for-cool control signal that is set to the first logic state irrespective of the requested compressor run time;

a compressor time-extending switching device having:

a first terminal including means for electrically connecting to a control circuit that controls electrical power to a compressor of the HVAC system when the first terminal is at the first logic state;

a second terminal including means for receiving the call-for-cool control signal from the temperature control device, and a third terminal including means for receiving a proxy call-for-cool control signal from the power supply, the compressor time-extending switching device configured to extend an individual compressor run time when a requested compressor run time period is less than a predetermined minimum compressor run time period by selectively disconnecting the first terminal from the second terminal and connecting the first terminal to the third terminal, thereby causing the control circuit to receive the first logic state of the proxy call-for-cool control signal and extending the compressor run time irrespective of the logic state of the call-for-cool control signal.

2. The extended run-time device of claim 1, wherein the temperature control device comprises a thermostat.

3. The extended run-time device of claim 1, further comprising a sensing circuit including means for receiving the call-for-cool control signal and to output a sense signal, wherein the sensing circuit samples the call-for-cool control signal at a predetermined sampling frequency to detect the presence or absence of the first logic state or the second logic state.

4. The extended run-time device of claim 1, wherein the call-for-cool control signal comprises a 24VAC control signal in the first logic state.

5. The extended run-time device of claim 3, wherein the sensing circuit comprises a Schmitt trigger sense circuit.

6. The extended run-time device of claim 1, wherein the compressor time-extending switching device comprises a relay.

7. The extended run-time device of claim 1 further comprising a processor in electrical communication with the sensing circuit and the compressor time-extending switching device, the processor including means for receiving the sense signal from the sensing circuit, determining a requested compressor run time period based upon a call-for-cool control signal, and transmitting a switching control signal to the compressor time-extending switching device, thereby controlling the compressor time-extending switching device to extend the individual compressor run time, wherein the processor is further configured to determine whether the requested compressor run time period is less than the predetermined minimum individual compressor run time period, and to transmit the switching control signal to the compressor time-extending switching device when the compressor run time period is less than the predetermined minimum compressor run time period.

8. The extended run-time device of claim 1, wherein the extended individual compressor run time period is substantially equal to the minimum compressor run-time period less the requested compressor run time period.

9. The extended run-time device of claim 1, wherein the extended individual compressor run time period is a multiple of the requested run time period.

10. The extended run-time device of claim 1, further comprising a fan time-extending switching device in electrical communication with the temperature control device, a circulation fan, and a processor.

11. The extended run-time device of claim 10, wherein the processor controls the fan time-extending switching device so as to extend a requested call-for-fan time period from the temperature control device, thereby causing the circulation fan to continue to run after an expiration of the requested call-for-fan time period.

12. The extended run-time device of claim 10, wherein the control circuit comprises a cooling contactor.

13. The extended run-time device of claim 1, wherein the extended run-time device is integrated into a load-control switch.

14. The extended run-time device of claim 1, wherein the extended run-time device is integrated into a fan-control board of a forced air unit.

* * * * *